United States Patent
Qiu et al.

(10) Patent No.: US 11,742,504 B2
(45) Date of Patent: Aug. 29, 2023

(54) VEHICLE FUEL CELL PURGING SYSTEM

(71) Applicant: FORD GLOBAL TECHNOLOGIES, LLC, Dearborn, MI (US)

(72) Inventors: Zeng Qiu, Grosse Pointe Woods, MI (US); Rajit Johri, San Francisco, CA (US); Craig Winfield Peterson, West Bloomfield, MI (US); Alireza Goshtasbi, Ann Arbor, MI (US); Hao Wang, Ann Arbor, MI (US); Ming Cheng, Northville, MI (US); William Frederick Sanderson, Jr., Commerce Township, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 17/578,971

(22) Filed: Jan. 19, 2022

(65) Prior Publication Data
US 2023/0231166 A1   Jul. 20, 2023

(51) Int. Cl.
*H01M 8/04746* (2016.01)
*H01M 8/04089* (2016.01)

(52) U.S. Cl.
CPC ... *H01M 8/04753* (2013.01); *H01M 8/04089* (2013.01); *H01M 8/04761* (2013.01); *H01M 2250/20* (2013.01)

(58) Field of Classification Search
CPC ......... H01M 8/04753; H01M 8/04089; H01M 8/04761; H01M 2250/20
See application file for complete search history.

(56) References Cited

U.S. PATENT DOCUMENTS

| | | | | |
|---|---|---|---|---|
| 10,497,952 | B2* | 12/2019 | Riley | H01M 8/04253 |
| 2010/0129688 | A1* | 5/2010 | Schmidt | H01M 8/04805 429/443 |
| 2011/0165480 | A1 | 7/2011 | Rose et al. | |
| 2015/0280260 | A1* | 10/2015 | Lee | H01M 8/04164 429/414 |
| 2018/0294497 | A1* | 10/2018 | Asai | H01M 8/04201 |
| 2019/0341638 | A1* | 11/2019 | Kawabuchi | H01M 8/04228 |
| 2021/0020969 | A1 | 1/2021 | Kwon et al. | |
| 2021/0305599 | A1* | 9/2021 | Koiwa | H01M 8/04761 |
| 2022/0255099 | A1* | 8/2022 | Mizuno | H01M 8/04201 |

OTHER PUBLICATIONS

Pukrushpan, Jay T., Anna G. Stefanopoulou, and Huei Peng. Control of fuel cell power systems: principles, modeling, analysis and feedback design. Springer Science & Business Media, 2004.

* cited by examiner

*Primary Examiner* — Stewart A Fraser
(74) *Attorney, Agent, or Firm* — David B Kelley; Brooks Kushman P.C.

(57) ABSTRACT

A vehicle includes a fuel cell, an inlet valve, a purge valve, and a controller. The fuel cell has an anode side configured to receive hydrogen. The inlet valve is configured to open to deliver the hydrogen to the anode side. The purge valve is configured to open to purge water and nitrogen from the anode side. The controller is programmed to, operate the inlet valve to inject hydrogen into the anode side via opening the inlet valve followed by closing the inlet valve. The controller is further programmed to, in response to a concentration of the hydrogen in the anode side being less than threshold, open the purge valve to purge water and nitrogen from the anode side.

20 Claims, 3 Drawing Sheets

VEHICLE FUEL CELL PURGING SYSTEM

TECHNICAL FIELD

The present disclosure relates to vehicles having fuel cells.

BACKGROUND

Vehicles may include fuel cell systems that generate electrical power.

SUMMARY

A vehicle includes a fuel cell, an injection valve, a purge valve, and a controller. The fuel cell has a stack configured to generate power. The stack has an anode side configured to receive hydrogen and a cathode side configured to receive air. The injection valve is configured to open to deliver the hydrogen to the anode side. The purge valve is configured to open to purge water and nitrogen from the anode side. The controller is programmed to, operate the injection valve to deliver hydrogen to the anode side according to a pulse delivery method via opening the injection valve followed by closing the injection valve, wherein a single pulse of the pulse delivery method corresponds to a time between each opening of the injection valve. The controller is further programmed to, in response to a concentration of the hydrogen in the anode side being less than a threshold during at least one pulse, open the purge valve to purge water and nitrogen from the anode side. The concentration of the hydrogen in the anode side is based on (i) a change in a voltage of the stack and (ii) a change in a pressure of the anode side while the injection valve is closed during each pulse. The controller further is programmed to, in response to the concentration of the hydrogen in the anode side not being less than the threshold during each pulse, maintain a closed condition of the purge valve.

A vehicle includes a fuel cell stack, an inlet valve, a purge valve, and a controller. The fuel cell stack has an anode side configured to receive hydrogen. The inlet valve is configured to open to deliver the hydrogen to the anode side. The purge valve is configured to open to purge water and nitrogen from the anode side. The controller is programmed to, operate the inlet valve to inject hydrogen into the anode side via opening the inlet valve followed by closing the inlet valve. The controller is further programmed to, in response to a concentration of the hydrogen in the anode side being less than a threshold, open the purge valve to purge water and nitrogen from the anode side. The concentration of the hydrogen in the anode side is based on (i) a change in a voltage of the fuel cell stack and (ii) a change in a pressure of the anode side while the inlet valve is closed.

A vehicle includes a fuel cell stack, an inlet valve, a purge valve, and a controller. The fuel cell stack has an anode side configured to receive hydrogen. The inlet valve is configured to open to deliver the hydrogen to the anode side. The purge valve is configured to open to purge water and nitrogen from the anode side. The controller is programmed to, open the inlet valve at a first instance to inject hydrogen into the anode side, close the inlet valve subsequent to opening the inlet valve at the first instance, and open the inlet valve at a second instance, subsequent to closing the inlet valve, to inject hydrogen into the anode side. The controller is further programmed to, in response to the concentration of the hydrogen in the anode side being less than a threshold, open the purge valve to purge water and nitrogen from the anode side. The concentration of the hydrogen in the anode side is based on (i) a change in a voltage of the fuel cell stack over a time period corresponding to the inlet valve being closed and (ii) a change in a pressure of the anode side over the time period.

DETAILED DESCRIPTION

Embodiments of the present disclosure are described herein. It is to be understood, however, that the disclosed embodiments are merely examples and other embodiments may take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the embodiments. As those of ordinary skill in the art will understand, various features illustrated and described with reference to any one of the figures may be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

It is recognized that any circuit or other electrical device disclosed herein may include any number of microprocessors, integrated circuits, memory devices (e.g., FLASH, random access memory (RAM), read only memory (ROM), electrically programmable read only memory (EPROM), electrically erasable programmable read only memory (EEPROM), or other suitable variants thereof) and software which co-act with one another to perform operation(s) disclosed herein. In addition, any one or more of the electrical devices as disclosed herein may be configured to execute a computer-program that is embodied in a non-transitory computer readable medium that is programmed to perform any number of the functions as disclosed herein.

Figure 1:
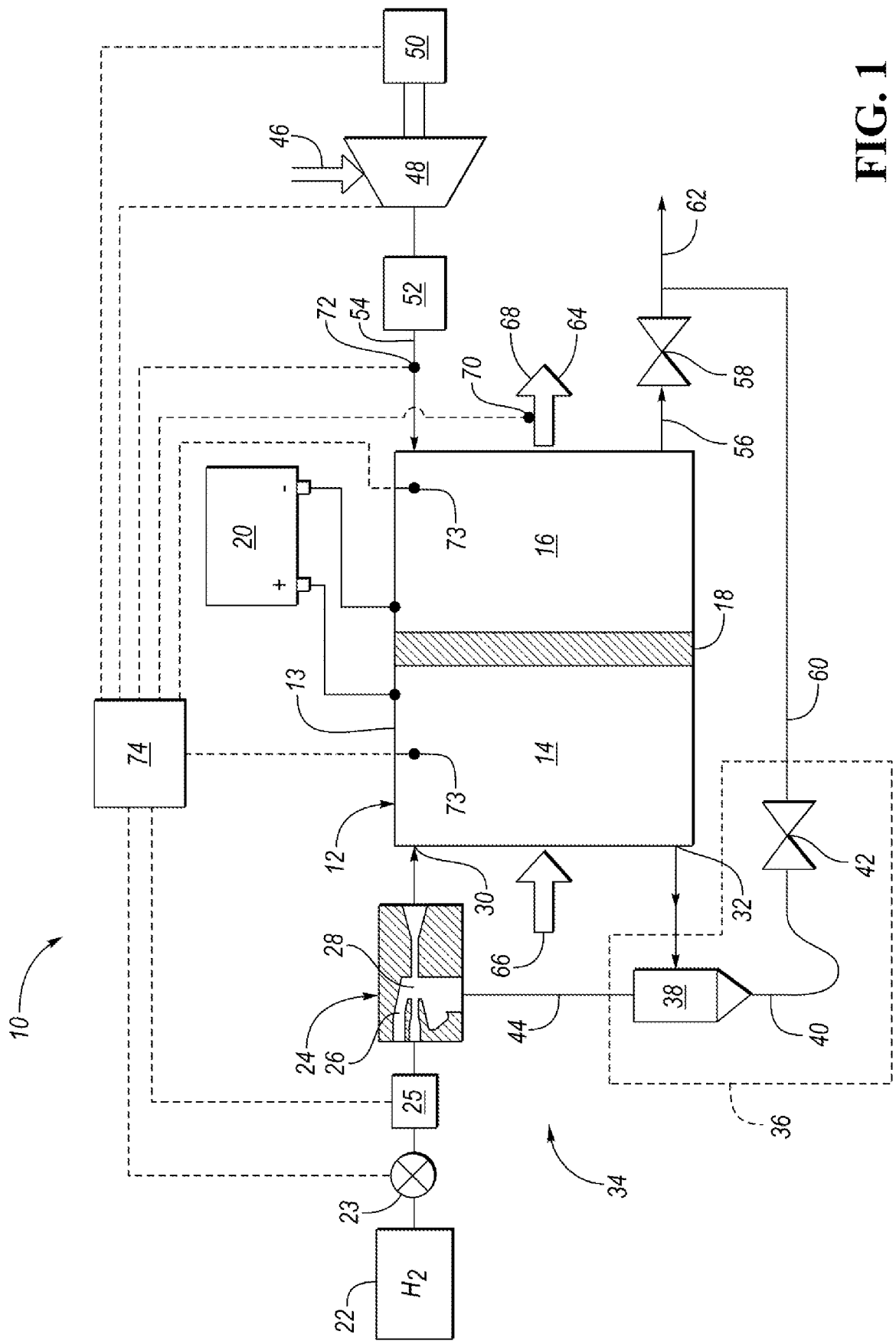
FIG. 1 is a schematic diagram representative of a fuel cell system.

FIG. 1 schematically illustrates a fuel cell system ("the system") 10 as a process flow diagram according to at least one embodiment. For example, system 10 may be used in a vehicle to provide electrical power to operate an electric motor to propel the vehicle or perform other vehicle functions. The system 10 may be implemented in a fuel cell based electric vehicle or a fuel cell based hybrid vehicle or any other such apparatus that uses electrical current to drive various devices.

The system 10 has a fuel cell stack ("the stack") 12. The stack 12 includes multiple cells, with each cell 13 having an anode side 14 (including an anode catalyst), a cathode side 16 (including a cathode catalyst), and a membrane 18 between the anode and cathode catalyst. Only one fuel cell 13 of the fuel cell stack 12 is illustrated in FIG. 1, although the stack 12 contains any number of cells. The stack 12 electrically communicates with and provides energy, for example, to a high voltage bus or a traction battery 20. The stack 12 generates stack current in response to electrochemically converting hydrogen and oxygen. The stack 12 may also have a cooling loop (not shown).

Various electrical devices may be coupled to the battery 20 to consume such power in order to operate. If the system 10 is used in connection with a vehicle, the devices may include a motor or a plurality of vehicle electrical components that each consume power to function for a particular purpose. For example, such devices may be associated with and not limited to a vehicle powertrain, cabin heating and cooling, interior/exterior lighting, entertainment devices, and power locking windows. The particular types of devices implemented in the vehicle may vary based on vehicle content, the type of motor used, and the particular type of fuel cell stack implemented.

During operation of the system 10, product water, residual fuel such as hydrogen, and byproducts such as nitrogen, may accumulate at the anode side 14 of the stack 12. Attempts have been made to remove the liquid product water and byproducts and to reuse the residual hydrogen and at least a portion of the water vapor. One approach is to collect those constituents in a purge assembly 36 downstream of the stack 12, separate at least a portion of the liquid water, and return the remaining constituents to the stack 12 via a return passageway in a recirculation loop.

A primary fuel source 22 is connected to the anode side 14 of the stack 12, such as a primary hydrogen source, to provide a supply fuel stream (or an anode stream). Non-limiting examples of the primary hydrogen source 22 are a high-pressure hydrogen storage tank or a hydride storage device. For example, liquid hydrogen, hydrogen stored in various chemicals such as sodium borohydride or alanates, or hydrogen stored in metal hydrides may be used instead of compressed gas. A tank valve 23 controls the flow of the supply hydrogen. A pressure regulator 25 may be included to regulate the flow of the supply hydrogen. The tank valve 23 may also be referred to as an inlet valve or an injection valve. The tank valve 23 is configured open to deliver the hydrogen to the anode side 14 and close to restrict hydrogen from flowing into the anode side 14.

The hydrogen source 22 is connected to one or more ejectors 24. The ejector may be a variable or multistage ejector or other suitable ejector. The ejector 24 is configured to combine the supply hydrogen (e.g., hydrogen received from the source 22) with unused hydrogen (e.g., recirculated from the fuel cell stack 12) to generate an input fuel stream. The ejector 24 controls the flow of the input fuel stream to the stack 12. The ejector 24 has a nozzle 26 supplying hydrogen into the converging section of a converging-diverging nozzle 28. The diverging section of the nozzle 28 is connected to the input 30 of the anode side 14.

The output 32 of the anode side 14 is connected to a recirculation loop 34. The recirculation loop 34 may be a passive recirculation loop, as shown, or may be an active recirculation loop according to another embodiment. Typically, an excess of hydrogen gas is provided to the anode side 14 to ensure that there is sufficient hydrogen available to all of the cells in the stack 12. In other words, under normal operating conditions, hydrogen is provided to the fuel cell stack 12 above a stoichiometric ratio of one, i.e. at a fuel-rich ratio relative to exact electrochemical needs. The unused fuel stream, or recirculated fuel stream, at the anode output 32 may include various impurities such as nitrogen and water both in liquid and vapor form in addition to hydrogen. The recirculation loop 34 is provided such that excess hydrogen unused by the anode side 14 is returned to the input 30 so it may be used and not wasted.

Accumulated liquid and vapor phase water is an output of the anode side 14. The anode side 14 requires humidification for efficient chemical conversion and to extend membrane life. The recirculation loop 34 may be used to provide water to humidify the supply hydrogen gas before the input 30 of the anode side 14. Alternatively, a humidifier may be provided to add water vapor to the input fuel stream.

The recirculation loop 34 contains a purging assembly 36 to remove impurities or byproducts such as excess nitrogen, liquid water, and/or water vapor from the recirculation stream. The purging assembly 36 includes a water separator or knock-out device 38, a drain line 40 and a control valve 42, such as a purge valve. The separator 38 receives a stream or fluid mixture of hydrogen gas, nitrogen gas, and water from the output 32 of the anode side 14. The water may be mixed phase and contain both liquid and vapor phase water. The separator 38 removes at least a portion of the liquid phase water, which exits the separator through drain line 40. At least a portion of the nitrogen gas, hydrogen gas, and vapor phase water may also exit the drain line 40, and pass through a control valve 42, for example, during a purge process of the fuel cell stack 12. The control valve 42 may be a solenoid valve or other suitable valve. The remainder of the fluid in the separator 38 exits through passageway 44 in the recirculation loop 34, which is connected to the ejector 24, as shown, or an active anode recirculation rotary device. The stream in passageway 44 may contain a substantial amount of hydrogen compared to the stream in drain line 40. The fluid in passageway 44 is fed into the converging section of the converging-diverging nozzle 28 where it mixes with incoming hydrogen from the nozzle 26 and hydrogen source 22.

The cathode side 16 of the stack 12 receives oxygen in a cathode stream, for example, as a constituent in an air source 46 such as atmospheric air. In one embodiment, a compressor 48 is driven by a motor 50 to pressurize the incoming air. The pressurized air, or cathode stream, may be humidified by a humidifier 52 before entering the cathode side 16 at inlet 54. The water may be needed to ensure that membranes 18 for each cell 13 remain humidified to provide for optimal operation of the stack 12. The output 56 of the cathode side 16 is configured to discharge excess air and is connected to a valve 58. Drain line 60 from the purging assembly 36, may be connected to an outlet 62 downstream of the valve 58. In other embodiments, the drain lines may be plumbed to other locations in the system 10.

The stack 12 may be cooled using a coolant loop 64 as is known in the art. The coolant loop 64 has an inlet 66 and an outlet 68 to the stack 12 to cool the stack. The coolant loop 64 may have a temperature sensor 70 to determine the coolant temperature. The coolant temperature may correspond to a temperature of the stack 12 or a separate sensor may be used to determine the temperature of the stack 12, which may be communicated to the controller (74).

The stack 12 may also have a humidity sensor 72 positioned at the inlet 54 to the cathode side 16 of the stack 12. The sensor 72 may also include a temperature sensing module. Pressure sensors 73 may be utilized to determine the respective pressures within the anode side 14 of the stack 12 and the cathode side 16 of the stack 12. Temperature sensors (not shown) may also be utilized to determine the respective temperature within the anode side 14 of the stack 12 and the cathode side 16 of the stack 12.

A controller 74 receives signals from the sensors 70, 72, 73, and any other sensor that may be associated with the fuel cell system 10. The controller 74 may be a single controller or multiple controllers in communication with one another. The controller 74 may also be in communication with the valve 23, regulator 25, valve 42, valve 58, compressor 48, and motor 50.

During operation, the stoichiometric ratio of total reactant per reactant electrochemically needed for both reactants of the fuel cell system may be controlled based on the fuel cell operating state, environmental conditions, and the like. The stoichiometry may be controlled by using the valve 23 and regulator 25 on the anode side 14 to control the flow rate of fuel or hydrogen to the stack 12, and by using the compressor 48 and motor 50 on the cathode side 16 to control the flow rate of air to the stack 12. The system 10 may be operated through a range of fuel and air stoichiometric ratios. As the system 10 is operated at a lower power level, the amount of water byproduct will decrease, as the amount of current drawn from the stack 12 decreases.

Figure 2:
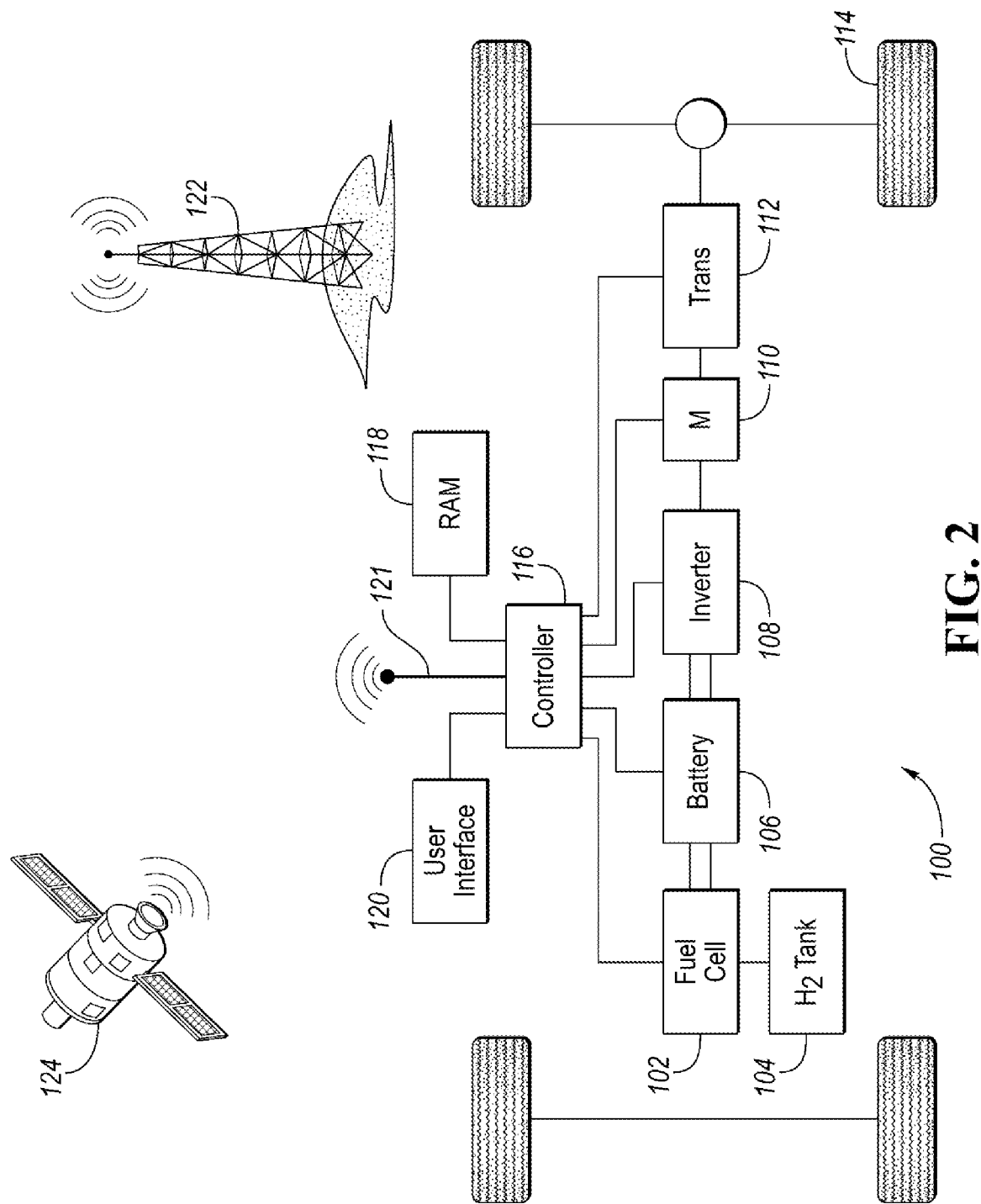
FIG. 2 is a schematic diagram representative of a vehicle that includes a fuel cell system.

FIG. 2 illustrates a vehicle 100 having a fuel cell system ("the system") 102 according to an embodiment. The system 102 may be a fuel cell system as described with respect to FIG. 1. The system 102 receives hydrogen from a storage tank 104 and air from the ambient environment to operate, and provides electrical energy to a battery 106 for storage. The battery 106 is connected to an inverter 108, which in turn powers an electric machine 110. The electric machine 110 may act as a motor to propel the vehicle 100, and in some embodiments, act as a generator to charge the battery 106. The electric machine 110 is connected to a transmission 112. The transmission 112 is connected to wheels 114 of the vehicle 100.

The vehicle has a control system 116. The control system 116 may include any number of controllers, and may be integrated into a single controller, or have various modules. Some or all of the controllers may be connected by a controller area network (CAN) or other system. The control system 116 may be connected to random access memory 118 or another data storage system. In some embodiments, the vehicle has a user interface 120 in communication with the control system 116. The user interface 120 may include an on-board vehicle system, and may also include a receiver configured to receive information and inputs from a remote user using a cellular phone, a computer, or the like. The user interface may also include a navigation system.

The control system 116 is in communication and is configured to control the system 102, battery 106, inverter 108, electric machine 110, and transmission 112. The control system 116 is also configured to receive signals from these vehicle components related to their status and the vehicle state.

The control system 116 has a receiver 121, which may include one or more antennae. Each antenna may be configured to wirelessly receive signals from various sources, including, but not limited to, cellular towers 122, satellites 124, wireless network servers, and the like.

The controllers 74, 116 described herein, may be part of a larger control system and may be controlled by various other controllers throughout the vehicle 100 or fuel cell system 10, such as a vehicle system controller (VSC). It should therefore be understood that the controllers 74, 116, and one or more other controllers, can collectively be referred to as a "controller" that controls various actuators in response to signals from various sensors to control various functions of the vehicle 100 or fuel cell system 10. The controller 24 may include a microprocessor or central processing unit (CPU) in communication with various types of computer readable storage devices or media. Computer readable storage devices or media may include volatile and nonvolatile storage in read-only memory (ROM), random-access memory (RAM), and keep-alive memory (KAM), for example. KAM is a persistent or non-volatile memory that may be used to store various operating variables while the CPU is powered down. Computer-readable storage devices or media may be implemented using any of a number of known memory devices such as PROMs (programmable read-only memory), EPROMs (electrically PROM), EEPROMs (electrically erasable PROM), flash memory, or any other electric, magnetic, optical, or combination memory devices capable of storing data, some of which represent executable instructions, used by the controller in controlling the vehicle 100 or fuel cell system 10.

A proton-exchange membrane fuel cell is an electrochemical device that converts the chemical energy in hydrogen (H2) and oxygen (O2) into electrical energy, with water as its byproduct. H2 and O2 are delivered to the anode side and cathode side, respectively. There are two types of H2 delivery: continuous flow and pulse injection delivery. A pump can be used to supply a continuous flow of H2. For pulse injection delivery, however, an injection valve (e.g., valve 23) is used to regulate the anode pressure. When anode pressure is low, the injection valve is open, and a rapid stream of H2 rushes into the anode loop. When anode pressure is high, the injection valve is closed, and no H2 flows into the system.

During system operation, both water and nitrogen (N2) can permeate through the membrane (e.g., membrane 18) from the cathode side to the anode side. While H2 supply has a high concentration level at the inlet of the injection valve, water and N2 can accumulate on the anode side, lowering H2 concentration level in the anode loop. If H2 concentration is too low, some cells may experience H2 starvation, which can cause cell voltage reversal and lead to cell damage.

A purge valve (e.g., valve 42) can remove water and N2 from the anode loop. However, when H2 concentration is too high, opening the purge valve may release H2 into the atmosphere, which reduces the system efficiency. Overall, we need to make sure that H2 concentration is maintained within a certain range through proper purge valve control for maintaining safe operation and system efficiency.

However, H2 concentration sensors are expensive for mass-produced vehicle instrumentation. Therefore, an algorithm for estimating H2 concentration is crucial to achieve desired purge valve control. Such estimation can be used as feedback for purge valve control for stack safety and system efficiency without the expense of an H2 concentration sensor.

When a fuel cell is operated according to the pulse injection delivery method, the injection valve (e.g., valve 23) opens, anode pressure (e.g., pressure on the anode side 14) increases to $p_{anode,max}$ and then the injection valve closes, and stack voltage increases to $V_{st,max}$. When the injection valve is closed, if there is current draw, anode pressure decreases to $p_{anode,min}$ as H2 is consumed until the injection valve opens again, and stack voltage decreases to $V_{st,min}$. The voltage of the fuel cell stack 12 may be measured by a voltage sensor and communicated to the controller 74. A single pulse (e.g., one injection cycle) according to the pulse delivery method may correspond to a time between each opening of the injection valve. The H2 concentration may be estimated based on the delta or change in the stack voltage $\Delta V_{st} = V_{st,max} - V_{st,min}$ and the delta or change in anode pressure $\Delta p_{anode} = p_{anode,max} - p_{anode,min}$ while the injection valve is closed during each pulse or injection cycle.

The fuel cell stack voltage may be based on a model of the relationship between $\Delta V_{st}$ and H2 concentration level on the anode side. A fuel cell stack is a series connection of several fuel cells. Therefore, the stack voltage is the sum of all cell voltages. We assume that each cell has the same cell voltage $V_{cell}$, and $V_{cell}$ can be modeled by open circuit voltage (OCV) minus ohmic loss, activation loss, and concentration loss. These losses involve interactions of many variables, including membrane humidity level, cathode pressure, O2 concentration, stack current, coolant temperature, stack age, etc. Within one pulse, if the stack current $I_{st}$ does not vary, it may be assumed that these losses are constant. Note that this is a reasonable assumption because each pulse typically lasts for less than one second. With N cells, the delta or change in the stack voltage while the injection valve is closed during each pulse or injection cycle may be determined by equation (1):

$$\Delta V_{st} = V_{st,max} - V_{st,min} = N*(v_{cell,max} - v_{cell,min}) = N* (E_{max} - E_{min}) \quad (1)$$

where $$E = 1.229 - 0.85*10^{-3}*(T_{fc} - 298.15) + 4.3085*10^{-5}*T_{fc}*\left(\ln(p_{H2}) + \frac{1}{2}\ln(p_{O2})\right)$$

is the OCV of a fuel cell; $E_{max}$ is the maximum OCV experienced during each pulse (e.g., the OCV just after the injection valve closes during each pulse); $E_{min}$ is the minimum OCV experienced during each pulse (e.g., the OCV just prior to the injection valve opening during each pulse); $T_{fc}$ is the fuel cell temperature (e.g., the temperature of the stack 12); $p_{H2}$ is the partial pressure of H2 on the anode side; and $p_{O2}$ is the partial pressure of O2 on the cathode side. If we assume $T_{fc}$ and $p_{O2}$ are constant within one pulse, then equation (1) may be rewritten as equation (2):

$$\Delta V_{st} = \quad (2)$$
$$N*(E_{max} - E_{min}) = N*4.3085*10^{-5}*T_{fc}*(\ln(p_{H2,max}) - \ln(p_{H2,min})) =$$
$$N*4.3085*10^{-5}*T_{fc}*\ln\left(\frac{p_{H2,max}}{p_{H2,min}}\right)$$

where $p_{H2,max} = p_{anode,max}*\alpha_{H2}$, $\alpha_{H2}$ is the hydrogen concentration when anode pressure is $p_{anode,max}$; $p_{H2,min} = p_{anode,max}*\alpha_{H2} - \Delta p_{H2}$; and $\Delta p_{H2} = p_{H2,max} - p_{H2,min}$ is the delta or change of H2 partial pressure within the pulse. If we ignore the water and N2 permeation and if the purge valve remains closed within one pulse, then $\Delta p_{H2} = \Delta p_{anode}$. Based on such an assumption equation (2) may be rewritten as equation (3):

$$\Delta V_{st} = N*4.3085*10^{-5}*T_{fc}*\ln\left(\frac{p_{anode,max}*\alpha_{H2}}{p_{anode,max}*\alpha_{H2} - \Delta p_{anode}}\right) \quad (3)$$

Equation (3) may be further rearranged as equation (4):

$$\alpha_{H2} = \frac{\Delta p_{anode}}{p_{anode,max}\left(1 - e^{\frac{-\Delta V_{st}}{N*4.3085*10^{-5}*T_{fc}}}\right)}. \quad (4)$$

Equation (4) may be sufficient to estimate H2 concentration estimation. However, this estimation may yield an error, which is dependent on the stack current $I_{st}$ of the fuel cell. As the stack current $I_{st}$ increases, the pulse cycle becomes shorter, and the error in $\Delta p_{anode}$ may increase due to sensor reading dynamics and data sampling. Therefore, equation (4) may be adjusted by an error correction factor and rewritten as equation (5):

$$\alpha_{H2} = \frac{\Delta p_{anode}}{p_{anode,max}\left(1 - e^{\frac{-\Delta V_{st}}{N*4.3085*10^{-5}*T_{fc}}}\right)} * f(I_{st}) \quad (5)$$

where $f(I_{st})$ is the error correction factor. The error correction factor may be function of the stack current $I_{st}$. More specially, the values of the error correction factor may be based on a lookup table, which is stored in the controller 74, that corresponds to values of the error correction factor to values of the stack current $I_{st}$. The values of the lookup table may be based on recorded data (e.g., data from experimentation) and may be updated based on feedback control.

The equations (1)-(5) may be stored within the controller 74. The controller 74 may compute the values of the H2 concentration estimation $\alpha_{H2}$ of the anode side 14 of the stack 12. The controller 74 may then store the current and prior values of the H12 concentration estimation $\alpha_{H2}$ of the anode side 14 of the stack 12.

Figure 3:
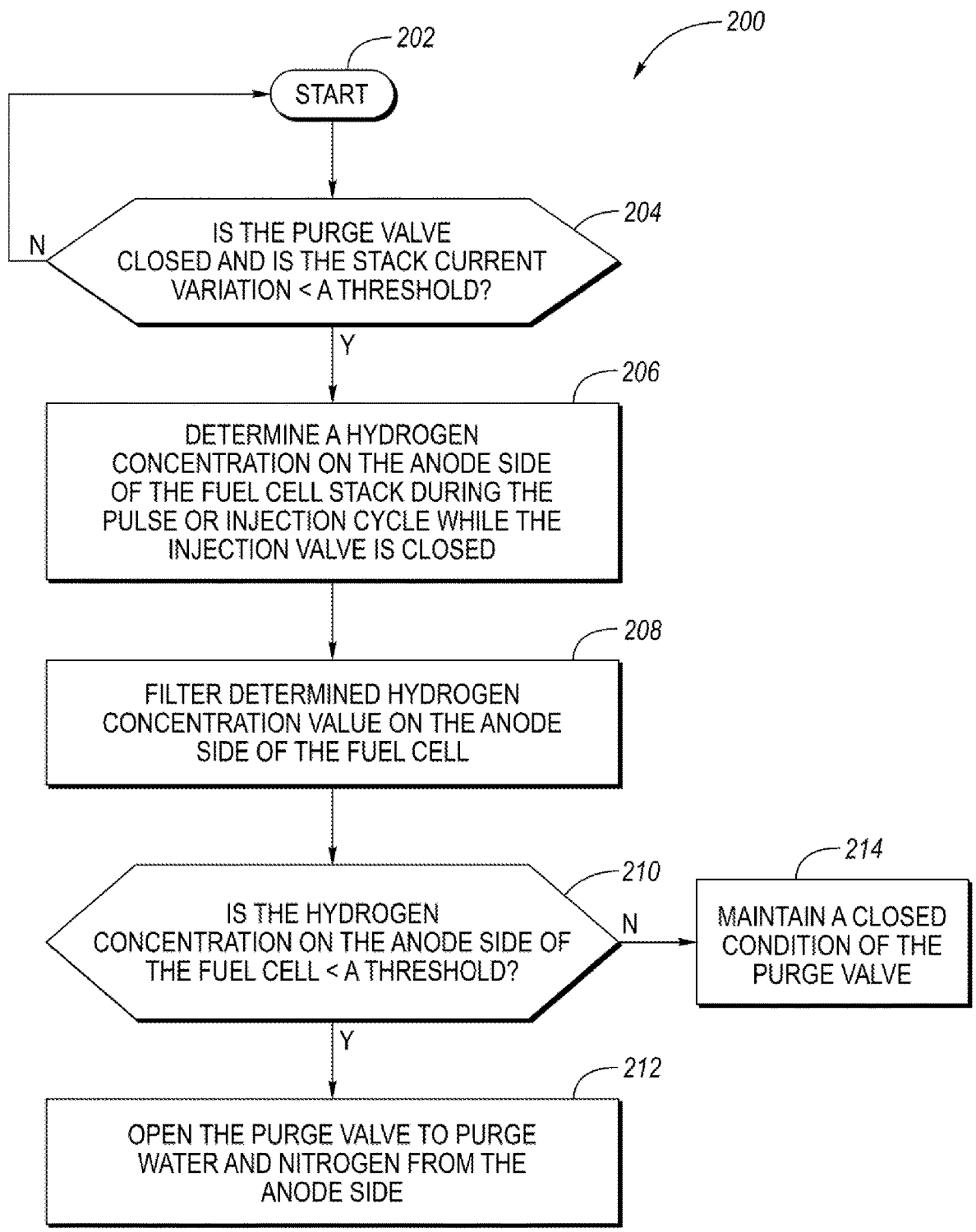
FIG. 3 is a flowchart illustrating a method of purging a fuel cell.

Referring to FIG. 3, a flowchart illustrating a method 200 of purging a fuel cell system (e.g., fuel cell system 10) is illustrated. The method 200 may be implemented by any of the controllers described herein (e.g., controller 74). The method 200 may be stored as control logic and/or algorithms within the controller. The controller may be configured to control the operation of various components of the fuel cell system 10 and/or vehicle 100 in response to various conditions of the fuel cell system 10 and/or vehicle 100. The method 200 begins at start block 202. The method 200 may be initiated at start block 202 during each pulse or injection cycle while the fuel cell is being operated according to the pulse injection delivery method.

Next, the method 200 moves on to block 204 where it is determined if the purge valve (e.g., valve 42) is closed and if a variation in the stack current $I_{st}$ is less than a threshold. If the purge valve (e.g., valve 42) is not closed or if a variation in the stack current $I_{st}$ is not less than the threshold the method 200 recycles back to the beginning of block 204. If the purge valve (e.g., valve 42) is closed and if the variation in the stack current $I_{st}$ is less than a threshold, the method 200 moves on to block 206.

At block 206, the H2 concentration estimation $\alpha_{H2}$ of the anode side of the fuel cell stack (e.g., anode side 14 of stack 12) is determined. More specifically, the H2 concentration estimation $\alpha_{H2}$ of the anode side of the fuel cell stack is determined according to equations (1)-(5) describe above during the pulse or injection cycle while the injection or inlet valve (e.g., valve 23) is closed (i.e., the H2 concentration estimation $\alpha_{H2}$ of the anode side of the fuel cell stack is determined based on the equations above during each pulse or injection cycle during the time period where the injection valve is closed). The method 200 then moves on to block 208 where the value of the H2 concentration estimation $\alpha_{H2}$ of the anode side of the fuel cell stack determined at block 206 is filtered to reduce noise from voltage measurements of the fuel cell stack and pressure measurements of the anode side of the stack. The filter at block 208 may be a recursive least square filter, a least mean squares filter, a Kalman filter, etc.

The method 200 next moves on to block 210 where it is determined if the value of the H2 concentration estimation $\alpha_{H2}$ of the anode side of the fuel cell stack is less than a threshold. If the value of the H2 concentration estimation $\alpha_{H2}$ of the anode side of the fuel cell stack is less than the threshold at block 210, the method 200 moves on to block 212 where the purge valve (e.g., valve 42) is opened to purge water and nitrogen from the anode side of the fuel cell stack. After a period of time, which may be a specified period of time, the purge valve 212 is then closed and the method 200 may return to start block 202. If the value of the H2 concentration estimation $\alpha_{H2}$ of the anode side of the fuel cell stack is not less than the threshold at block 210, the method 200 moves on to block 214 where the purge valve is maintained in a closed condition.

The method 200 is described as being applied over a single pulse or injection cycle (e.g., over time period corresponding to opening the injection or inlet valve at first instance, closing the inlet valve subsequent to the opening the injection or inlet valve at first instance, and opening the inlet valve at a second instance subsequent to closing the inlet valve). However, the method 200 could be said to apply over several pulse or injection cycles. Under such a circumstance, the method 200 would (i) transition to block 214 in response to the value of the H2 concentration estimation $\alpha_{H2}$ of the anode side of the fuel cell stack not being less than the threshold during each pulse or injection cycle or (ii) transition to block 212 in response to the value of the H2 concentration estimation $\alpha_{H2}$ of the anode side of the fuel cell stack being less than the threshold during at least one pulse or injection cycle.

It should be understood that the flowchart in FIG. 3 is for illustrative purposes only and that the method 200 should not be construed as limited to the flowchart in FIG. 3. Some of the steps of the method 200 may be rearranged while others may be omitted entirely.

It should be understood that the designations of first, second, third, fourth, etc. for any component, state, or condition described herein may be rearranged in the claims so that they are in chronological order with respect to the claims. Furthermore, it should be understood that any component, state, or condition described herein that does not have a numerical designation may be given a designation of first, second, third, fourth, etc. in the claims if one or more of the specific component, state, or condition are claimed.

The words used in the specification are words of description rather than limitation, and it is understood that various changes may be made without departing from the spirit and scope of the disclosure. As previously described, the features of various embodiments may be combined to form further embodiments that may not be explicitly described or illustrated. While various embodiments could have been described as providing advantages or being preferred over other embodiments or prior art implementations with respect to one or more desired characteristics, those of ordinary skill in the art recognize that one or more features or characteristics may be compromised to achieve desired overall system attributes, which depend on the specific application and implementation. As such, embodiments described as less desirable than other embodiments or prior art implementations with respect to one or more characteristics are not outside the scope of the disclosure and may be desirable for particular applications.

What is claimed is:

1. A vehicle comprising:
 a fuel cell having a stack for generating power, the stack has an anode side configured to receive hydrogen and a cathode side configured to receive air;
 an injection valve configured to open to deliver the hydrogen to the anode side;
 a purge valve configured to open to purge water and nitrogen from the anode side; and
 a controller programmed to,
  operate the injection valve to deliver hydrogen to the anode side according to a pulse delivery method via opening the injection valve followed by closing the injection valve, wherein a single pulse of the pulse delivery method corresponds to a time between each opening of the injection valve,
  in response to a concentration of the hydrogen in the anode side being less than a threshold during at least one pulse, open the purge valve to purge water and nitrogen from the anode side, wherein the concentration of the hydrogen in the anode side is based on a fraction having (i) a numerator that is based on a change in a pressure of the anode side while the injection valve is closed during each pulse and (ii) a denominator that is based on (a) a maximum pressure experienced by the anode side while the injection valve is closed during each pulse and (b) a change in a voltage of the stack while the injection valve is closed during each pulse, and
  in response to the concentration of the hydrogen in the anode side not being less than the threshold during each pulse, maintain a closed condition of the purge valve.

2. The vehicle of claim 1, wherein the concentration of the hydrogen in the anode side is further based on an error correction factor.

3. The vehicle of claim 2, wherein the error correction factor is a function of an electrical current of the stack.

4. The vehicle of claim 1, wherein the denominator corresponds to a product of (i) the maximum pressure experienced by the anode side while the injection valve is closed during each pulse and (ii) an exponential element.

5. The vehicle of claim 4, wherein the exponential element includes the change in the voltage of the stack while the injection valve is closed during each pulse.

6. The vehicle of claim 5, wherein exponential element further includes a temperature of the stack.

7. A vehicle comprising:
 a fuel cell stack having an anode side configured to receive hydrogen;
 an inlet valve configured to open to deliver the hydrogen to the anode side;
 a purge valve configured to open to purge water and nitrogen from the anode side; and
 a controller programmed to,
  operate the inlet valve to inject hydrogen into the anode side via opening the inlet valve followed by closing the inlet valve, and
  in response to a concentration of the hydrogen in the anode side being less than a threshold, open the purge valve to purge water and nitrogen from the anode side, wherein the concentration of the hydrogen in the anode side is based on a fraction having (i) a numerator that is based on a change in a pressure of the anode side while the inlet valve is closed and (ii) a denominator that is based on (a) a maximum pressure experienced by the anode side while the inlet valve is closed and (b) a change in a voltage of the stack while the inlet valve is closed.

8. The vehicle of claim 7, wherein the controller is further programmed to, in response to the concentration of the hydrogen in the anode side not being less than the threshold, maintain a closed condition of the purge valve.

9. The vehicle of claim 7, wherein the concentration of the hydrogen in the anode side is further based on an error correction factor.

10. The vehicle of claim 9, wherein the error correction factor is a function of an electrical current of the fuel cell stack.

11. The vehicle of claim 7, wherein the denominator corresponds to a product of (i) the maximum pressure experienced by the anode side while the inlet valve is closed and (ii) an exponential element.

12. The vehicle of claim 11, wherein the exponential element includes the change in the voltage of the stack while the inlet valve is closed.

13. The vehicle of claim 12, wherein exponential element further includes a temperature of the stack.

14. A vehicle comprising:
a fuel cell stack having an anode side configured to receive hydrogen;
an inlet valve configured to open to deliver the hydrogen to the anode side;
a purge valve configured to open to purge water and nitrogen from the anode side; and
a controller programmed to,
open the inlet valve at a first instance to inject hydrogen into the anode side,
close the inlet valve subsequent to opening the inlet valve at the first instance,
open the inlet valve at a second instance, subsequent to closing the inlet valve, to inject hydrogen into the anode side, and
in response to a concentration of the hydrogen in the anode side being less than a threshold, open the purge valve to purge water and nitrogen from the anode side, wherein the concentration of the hydrogen in the anode side is based on a fraction having (i) a numerator that is based on a change in a pressure of the anode side over a time period corresponding to the inlet valve being closed and (ii) a denominator that is based on (a) a maximum pressure experienced by the anode side over the time period and (b) a change in a voltage of the stack over the time period.

15. The vehicle of claim 14, wherein the controller is further programmed to, in response to the concentration of the hydrogen in the anode side not being less than the threshold, maintain a closed condition of the purge valve.

16. The vehicle of claim 14, wherein the concentration of the hydrogen in the anode side is further based on an error correction factor.

17. The vehicle of claim 16, wherein the error correction factor is a function of an electrical current of the fuel cell stack.

18. The vehicle of claim 14, wherein the denominator corresponds to a product of (i) the maximum pressure experienced by the anode side over the time period and (ii) an exponential element.

19. The vehicle of claim 18, wherein the exponential element includes the change in the voltage of the stack over the time period.

20. The vehicle of claim 19, wherein exponential element further includes a temperature of the stack.

* * * * *